(12) United States Patent
Ni

(10) Patent No.: US 7,798,405 B2
(45) Date of Patent: Sep. 21, 2010

(54) OPTICAL IMAGING DEVICE FOR THE RECOGNITION OF FINGER PRINTS

(75) Inventor: Yang Ni, Palaiseau (FR)

(73) Assignee: New Imaging Technologies, Evry (FR)

( * ) Notice: Subject to any disclaimer, the term of this patent is extended or adjusted under 35 U.S.C. 154(b) by 309 days.

(21) Appl. No.: 11/322,221

(22) Filed: Jan. 3, 2006

(65) Prior Publication Data

US 2008/0073424 A1    Mar. 27, 2008

Related U.S. Application Data

(63) Continuation of application No. PCT/FR2004/050325, filed on Jul. 9, 2004.

(30) Foreign Application Priority Data

Jul. 9, 2003    (FR) .................................. 03 08426

(51) Int. Cl.
*G06K 7/14* (2006.01)
*G06K 9/00* (2006.01)
(52) U.S. Cl. ...................... 235/454; 382/124
(58) Field of Classification Search ................ 235/454; 356/71; 382/124, 125–127
See application file for complete search history.

(56) References Cited

U.S. PATENT DOCUMENTS

| 5,177,802 | A | * | 1/1993 | Fujimoto et al. ............ 382/124 |
| 5,448,659 | A | | 9/1995 | Tsutsui et al. |
| 5,619,586 | A | | 4/1997 | Sibbald |
| 6,182,892 | B1 | | 2/2001 | Angelo et al. |
| 6,553,134 | B1 | | 4/2003 | Amano et al. |
| 2001/0038453 | A1 | * | 11/2001 | Jung et al. ................... 356/419 |
| 2004/0179722 | A1 | * | 9/2004 | Moritoki et al. ............. 382/124 |
| 2005/0265585 | A1 | * | 12/2005 | Rowe .......................... 382/124 |

FOREIGN PATENT DOCUMENTS

| EP | 0 609 812 | A1 | | 8/1994 |
| EP | 1 022 675 | A2 | | 7/2000 |
| EP | 1 104 908 | A1 | | 6/2001 |
| FR | 2 778 548 | A1 | | 11/1999 |
| JP | A 64-037934 | | | 2/1989 |
| JP | 2005025307 | A | * | 1/2005 |
| WO | WO 92/20037 | | | 11/1992 |

OTHER PUBLICATIONS

Drake, Marvin D. et al., "Waveguide Hologram Fingerprint Entry Device," Optical Engineering Society of Photo-Optical Instrumentation Engineers, vol. 35, No. 9, Sep. 1, 1996, pp. 2499-2505.
Ni, Yang et al., "CMOS Active Differential Imaging Device with Single in-pixel Analog Memory," ESSCIRC '02, Sep. 24, 2002, pp. 359-362.

* cited by examiner

*Primary Examiner*—Jamara A Franklin
(74) *Attorney, Agent, or Firm*—Oliff & Berridge, PLC

(57) ABSTRACT

The invention relates to an optical imagery device comprising: a light source, an optical medium in which the light coming from the source can be propagated; a detection surface defined by a frontier of the optical medium; an image sensor towards which the light coming from the light source and undergoing reflection onto the detection surface is reflected. The inventive device is characterized in that it is arranged in such a way that from the sensor the source appears to be sufficiently pointed to enable an image to be formed directly on the sensor.

28 Claims, 2 Drawing Sheets

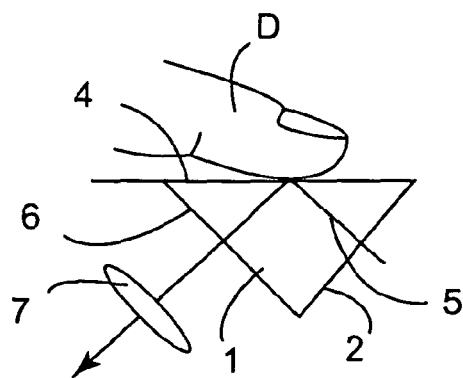
FIG.1 PRIOR ART
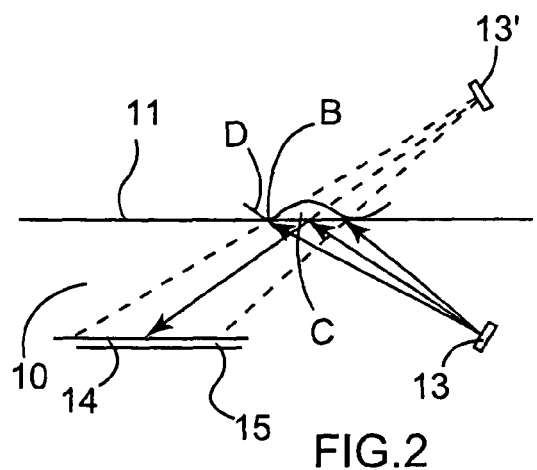
FIG.2
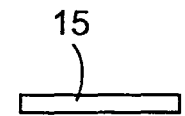
FIG.3
FIG.4
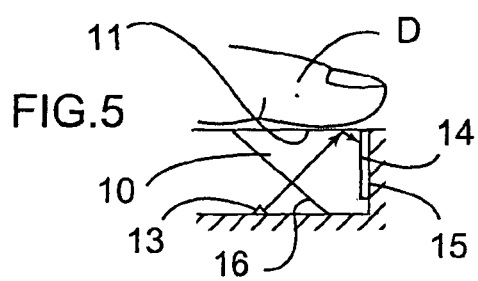
FIG.5
FIG.6
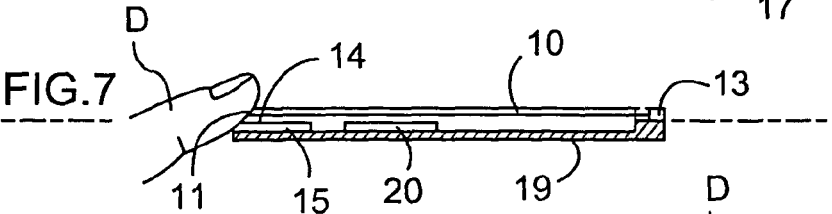
FIG.7
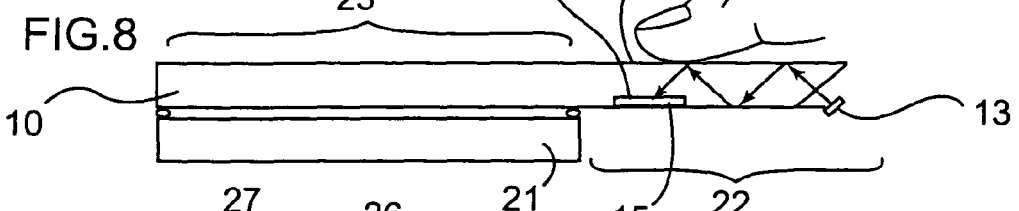
FIG.8
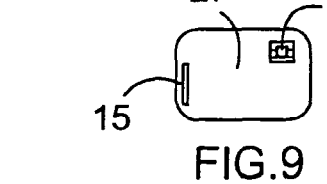
FIG.9
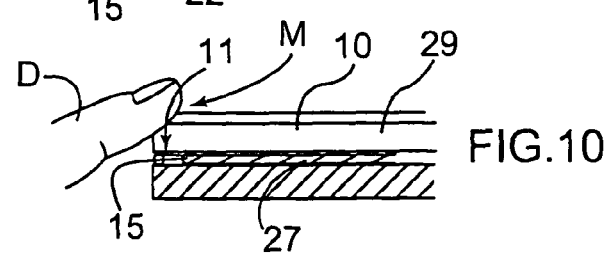
FIG.10

OPTICAL IMAGING DEVICE FOR THE RECOGNITION OF FINGER PRINTS

This is a Continuation of International Application No. PCT/FR2004/050325 filed Jul. 9, 2004, which claims priority from French Patent Application No. 03 08426 filed Jul. 9, 2003. The entire disclosure of the prior applications is hereby incorporated by reference herein in its entirety.

The present invention relates to optical imaging devices and more particularly, but not exclusively, to those intended for fingerprint recognition.

An example of an optical imaging device produced in accordance with the prior art is shown schematically in FIG. 1.

This device comprises a prism 1. A light beam 5 emitted by a light source (not shown) enters this prism 1 via a first face 2 thereof. A second face 4 of the prism 1 defines a detection surface on which a finger F can be placed. In the absence of the latter, the light is totally reflected toward the third face 6 of the prism 1. The light beam 5 undergoes, at the raised features of the finger F in contact with the detection surface, frustrated reflection, thereby allowing an image to be formed on an image sensor, of the CCD or CMOS type, not shown, after light has passed through a focusing lens 7. The latter must be of relatively long focal length so as to eliminate the scattered component, which reduces the compactness of the device.

There is a need to benefit from a device that can be manufactured reliably, with a small size and a cost compatible with large-scale use.

An object of the invention is an optical imaging device, comprising:

a light source;

an optical medium in which the light coming from the source can propagate;

a detection surface defined by one boundary of the optical medium; and an image sensor toward which the light coming from the source and undergoing a reflection on the detection surface is reflected, this device being configured so that the source appears from the image sensor as being sufficiently point-like for an image to be able to form directly on the image sensor.

The expression "image forming directly" should be understood within the context of the present invention to mean that the image can form without a lens system, according to the projection laws in geometrical optics.

The invention has many advantages.

Firstly, the device can be more readily miniaturized and made with increased robustness and reliability.

Secondly, its manufacture is less complex, thereby making it possible to reduce its cost and to generalize its use.

Finally, the electrical consumption of the light source may be reduced, thereby making it possible in particular to increase the life in the case in which the optical imaging device is used in portable instruments, such as for example telephones or personal digital assistants.

The light source may be seen from the image sensor with a size compatible with the resolution of the sensor. For example, for a sensor having detection cells with a size of about 50 µm, two rays emanating from two extreme points of the source and passing through the same point on the detection surface may form images separated by less than 100 µm in the plane of observation defined by the sensor, better still a distance of the size of a detection cell of the sensor, or smaller.

The light source may be located in the optical medium or outside the optical medium. In particular, the light source and the optical medium may or may not be separated by an air layer.

Likewise, the image sensor may be located in the optical medium or outside the latter. In particular, the image sensor and the optical medium may or may not be separated by an air layer.

The image sensor may or may not be separable from the optical medium. The image sensor may especially be integrated into a removable support, such as a payment or access card or a key or any other personal object, and the optical medium may belong to a reader suitable for cooperating with the support.

The support may include only the sensor and optionally electrical contacts designed to transmit data coming from the sensor to the reader. Where appropriate, the support may include at least one microcircuit comprising, for example, a processor and/or at least one memory.

One advantage in the possibility of separating the sensor from the optical medium is in particular that the same sensor can be used with several different readers. This further increases the reliability of recognizing an image or an analog or digital signature corresponding to a fingerprint.

The device may be configured so that the light emitted by the source and reaching the image sensor is reflected only on the detection surface. As a variant, the device may be designed in such a way that the light emitted by the source and reaching the image sensor undergoes at least two reflections, especially in the optical medium, before reaching the sensor.

The sensor may be a linear or matrix sensor.

The light source may be modulated, especially intensity-modulated, so as to increase the signal/noise ratio, it being possible for the image sensor to be tuned to this modulation of the source. An example of the modulation that can be used inter alia is described in the publication by Y. Ni and X. L. Yan, "*CMOS active differential imaging device with single in-pixel analog memory*", ESSCIRC '02, Sep. 24-26, 2002, Florence, Italy, pp. 359-362.

The light source may emit at several wavelengths located in the visible, infrared or ultraviolet ranges, and the image sensor may be designed to analyze images corresponding to each of these wavelengths. At least two analyses of images formed at two respective different wavelengths make it possible, where appropriate, to improve the reliability of the detection.

In one exemplary embodiment of the invention, the source lies below the level of the surface of the image sensor. Such an arrangement makes it possible in a simple manner to prevent light emitted by the source reaching the image sensor directly.

For example, the source may be located in a recess in a printed circuit, especially a multilayer printed circuit.

In one exemplary embodiment of the invention, the device includes a block of a transparent material covering the sensor and the source, this at least partly defining the optical medium.

This block may for example be molded over or bonded to both the sensor and the source. In the case of bonding, this may be carried out by means of a transparent adhesive, for example an ultraviolet-curable adhesive.

Advantageously, the aforementioned block includes, on top of the sensor, means for reducing the amount of stray light reaching the sensor. These means may for example comprise a delustered surface and/or a mask, approximately plumb with the sensor.

The material of the block may for example be chosen according to the wavelength of the source, so as to promote the propagation of the light emitted by the source while attenuating the propagation of the stray light.

The invention may be more clearly understood on reading the detailed description that follows of nonlimiting exemplary embodiments thereof, and on examining the appended drawing in which:

FIG. 1, described above, illustrates a device according to the prior art;

FIG. 2 shows schematically a first embodiment of a device according to the invention;

FIGS. 3 and 4 show schematically linear and matrix image sensors, respectively;

FIGS. 5 to 8 show, schematically and partially, in cross section, various embodiments, among others, of imaging devices according to the invention;

FIG. 9 shows, seen from above, an embodiment of a card that includes an image sensor;

FIG. 10 shows, in partial and schematic longitudinal section, an embodiment of a reader designed to cooperate with the card of FIG. 9;

Figure 11:
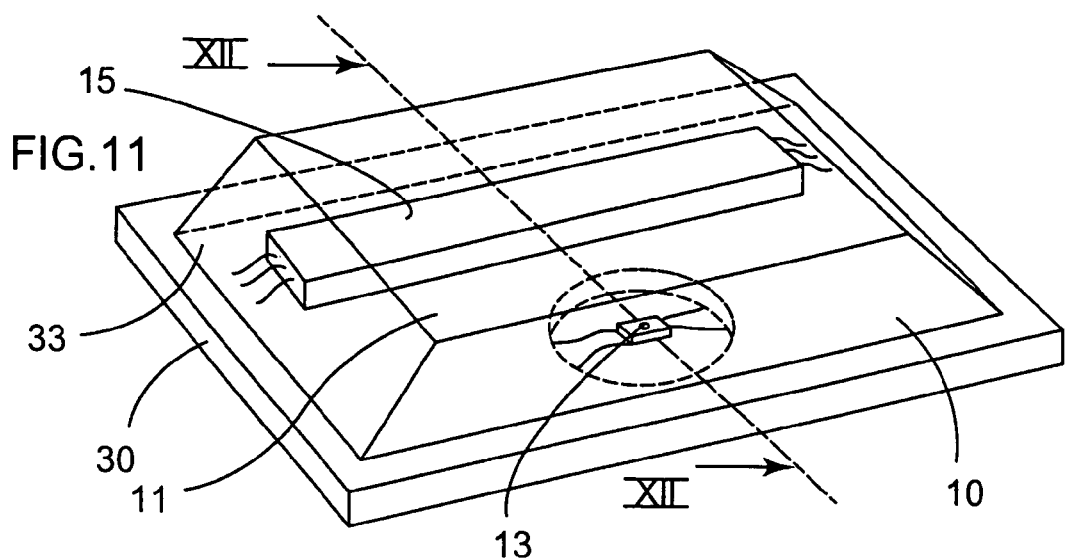
FIG. 11 is a schematic partial view showing a unit comprising a sensor and a source according to an exemplary embodiment of the invention.

The optical imaging device shown in FIG. 2 includes an optical medium 10 having a boundary with the air that defines a detection surface 11 on which a finger F may be placed, for example for the purpose of analyzing a fingerprint.

This finger F has, locally, regions B in the form of ridges that come into contact with the detection surface 11 and valleys C setback therefrom.

The detection surface 11 is illuminated by a light source 13. In the absence of a finger F, there is total reflection of the light on the detection surface 11. In the presence of the finger F, frustrated reflection is created at the interface with the skin.

According to one aspect of the invention, the source 13 behaves substantially as a point source when observed after reflection on the detection surface 11 from a plane of observation 14 defined by an image sensor 15.

According to the laws of geometrical optics, an image may be observed in the plane of observation 14, this image corresponding in the example shown in FIG. 2 to that which would be obtained with a source 13' symmetrical with the source 13 with respect to the plane of the detection surface 11, only the rays of which that pass through the regions not in contact with the skin and the detection surface 11 would be received in the plane of observation 14, the source 13' casting as it were the "shadow" of the regions of contact between the skin and the detection surface in the plane of observation 14.

The optical medium 10 may be made of any transparent material, whether colored or not, such as a mineral or organic glass, denser than air.

The optical medium 10 may especially comprise a plastic that is solid at room temperature and is transparent, at least at a wavelength of the light emitted by the source 13 and detected by the sensor 15.

The color of the optical medium 10 may be chosen so as to promote the propagation of the light emitted by the source 13 while attenuating the light having another wavelength, so as to reduce the amount of stray light reaching the sensor 15.

The image sensor 15 may be connected to any appropriate processing device (not shown) designed for example to reconstruct a more complete image from the data delivered by the sensor 15 and/or to identify, from at least one image received by the sensor 15, a person who has placed a finger on the detection surface 11 and, as the case may be, moved his finger over said detection surface.

The term "image" must not be taken restrictively, and an image may be reduced for example to a light or dark spot in the plane of observation 14.

The processing device may especially comprise and/or have access to a memory in which one or more images of fingerprints and/or corresponding signatures are recorded, and the processing device may be designed to compare any new image received by the sensor 15 and/or the corresponding signature with the prestored data.

The image sensor 15 may for example be a linear sensor, as shown in FIG. 3, or a matrix sensor, as shown in FIG. 4, of the CCD, CMOS or other type.

A linear sensor comprises for example one or more linear rays of detection cells placed end to end, each linear array comprising for example at least 256 cells.

A matrix sensor comprises for example at least two rows of at least 256 cells.

The use of a linear or matrix sensor having a small number of rows may allow a small image to be analyzed with less distortion than a larger image. When a linear sensor is used, this may be combined where appropriate with a mechanism driven so as to undergo a movement with the passage of the finger, so as to synchronize detection with the movement of the finger.

A linear or matrix sensor having few rows may be used in particular when the finger F is moved over the detection surface 11 in a direction perpendicular to the longitudinal axis of the surface, each image acquired by the sensor 15 then corresponding to a relatively narrow band of the surface of the finger.

The image sensor 15 may be designed to analyze an image at one or more particular wavelengths.

Preferably, so as to get round the problem of the ambient illumination, the source 13 emits intensity-modulated light and the sensor 15 is tuned to the frequency of modulation of the source 13. Thus, the information carried by the light coming from the source 13 may be further isolated from the ambient noise, and the signal/noise ratio is increased.

The image received in the plane of observation 14 is even sharper when the source 13 is a point source, owing to its dimensions and/or its distance. The reduction in size of the source 13 and its distance also make it possible to reduce the size of the image formed in the plane of observation, and therefore the size of the sensor 15 used, the area covered by the image that it is desired to form preferably being close to that covered by the detection cells of the sensor 15.

It may also prove desirable for the distance between the detection surface 11 and the sensor 15 to be as short as possible.

The detection surface 11 may for example extend over a width similar to that of a fingerprint.

To produce the source 13, it may be advantageous to use a miniature optical component, for example a single light-emitting diode or laser diode, with no diffuser or lens, and to place the source 13 remote from the plane of observation 14, for example by means of multiple reflections. Where appropriate, the source 13 may include a mask (not shown) provided with a single small aperture, for the point-like exit of the light.

The source 13 may also include, where appropriate, an optical fiber. The light may especially be emitted via the end of this optical fiber.

The multiple reflections may be internal reflections, at the interface between the optical medium 10 and the air or between the optical medium 10 and another medium of smaller index, and/or reflections on reflecting surfaces, especially metallized surfaces, either external or internal to the optical medium 10.

The orientation and relative arrangements of the plane of observation 14 and the detection surface 11 may vary.

FIG. 5 shows another exemplary embodiment of the invention in which the detection surface 11 is oriented at approximately 90° to the plane of observation 14.

Furthermore, in this embodiment, the source 13 lies outside the optical medium 10 and the light enters this medium perpendicular to one face 16 thereof, the device being designed so that there is only a single reflection on the detection surface 11.

In the embodiment shown in FIG. 6, there are several intermediate reflections between the source 13 and the plane of observation 14, thereby making it possible for the source 13 to be optically remote from the plane of observation 14 and, for example, for a thin optical medium 10 to be used, this being for example in the form of a plate.

In this embodiment, the light propagates, before reaching the detection surface 11, by being reflected in succession on two faces 17 and 18 that define an optical guide. The detection surface 11 lies in the extension of the face 16, which is plane in the embodiment in question. The face 17, which is also plane, is parallel to the face 16 and is in contact with a support 25 that bears the sensor 15.

In the embodiment shown in FIG. 7, the device has an elongate general form along a longitudinal axis X and the detection surface 11 is at one axial end of the device. For example, the latter is in the form of a card, which may further include, for example, electrical contacts and/or an antenna for remote data exchange. The card may in particular have contacts for supplying power to the source 13.

The optical medium 10 covers a support 19 which, in the embodiment in question, bears, apart from the source 13 and the image sensor 15, a circuit 20 for processing data coming from the sensor 15.

In the embodiment shown in this figure, the light emitted by the source 13 propagates approximately parallel to the support 19 before reaching the detection surface 11, where it is reflected toward the sensor 15.

The optical medium 10 may serve merely for propagating the light emitted by the source 13 with a view to analyzing the image formed after frustrated reflection on the detection surface 11.

The optical medium 10 may also exert at least one other function, and in particular it may serve to protect a display 21, as illustrated in FIG. 8, especially the display of a portable terminal.

In this embodiment, the optical medium 10 has a first portion 22 in which the light emitted by the source 13 propagates as far as the sensor 15, this first portion defining the detection surface 11, and a second, passive, portion 23 that covers the display 21. Optionally, the first portion may at least partly cover the display 21.

The sensor 15 may be separable from the optical medium 10 and in particular be integrated into a support, such as a payment or access card, which also includes means for data exchange, such as for example electrical contacts or a radio frequency device.

To give an example, FIG. 10 shows a payment card 27 that includes a sensor 15, for example a linear sensor, and a microcircuit 26 that includes electrical contacts.

The card 27 is intended to be received in a reader 29 having a light source and a device for reading the microcircuit 26 (these not being shown).

The card 27 is placed beneath the optical medium 10 of the reader 29, the detection surface 11 being arranged so that the light coming from the source is reflected on the sensor 15 when the card 27 is in place.

The user who has introduced the card 27 into the reader 29 can move his finger F in the direction of the arrow M over the detection surface 11. This allows a succession of images to be read by the sensor 15, this succession of images being representative of the fingerprint. The fingerprint reader may for example replace the input of a confidential code on a keyboard. The data may be transmitted by the sensor 15 to the microcircuit 26 and then to the reader 29.

The card 27 may be replaced with any other object, such as for example a key.

Figure 12:
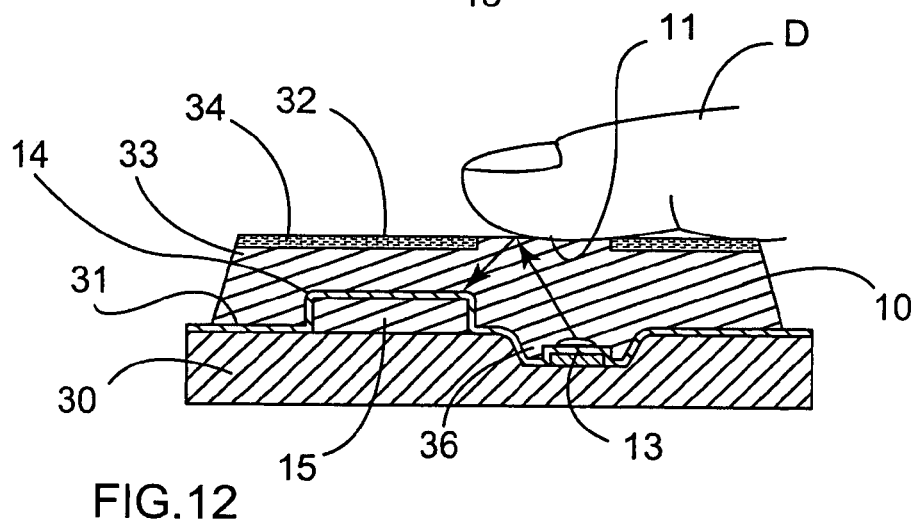
FIG. 12 is a schematic partial section on XII-XII of FIG. 11.

FIGS. 11 and 12 show a unit comprising, on a printed circuit 30, a source 13 and a sensor 15, these possibly being covered with an optical medium 10 consisting for example of a block 33 of transparent, mineral or organic, material. This block 33 may be fastened to the circuit 30 by means of a layer 31 of a transparent and relatively fluid adhesive, for example an ultraviolet-curable adhesive.

In FIG. 12, it may be seen that the source 13 lies below the level of the surface of the sensor 15 that defines the plane of observation 14, so that the light emitted by the source 13 does not reach this plane of observation 14 directly.

It may also be seen in FIG. 12 that the outer surface 32 of the block 33 is advantageously delustered or includes a mask in its region 34 located plumb with the plane of observation 14, thereby making it possible to reduce the amount of stray light liable to reach the plane of observation 14.

The recess 36 accommodating the source 13 is for example formed by removal of a layer of the printed circuit 30 when the latter has a multilayer structure.

An optical imaging device according to the invention can be used for applications other than identification and access control, and in particular it may be used to control a cursor or other object, whether physical or otherwise, by analyzing the movement of the finger or of an inanimate object, such as a stylus, over the detection surface 11.

The sensor 15 may especially be associated with a processing device capable of determining the movement of a finger relative to the detection surface, at least in one direction, and preferably in two mutually perpendicular directions. The detection surface 11 may then for example replace the navigation button on a mobile telephone.

The device may also be used for taking images of non-dermatoglyphic areas of the human body, so as for example to analyze the microrelief of the skin, for cosmetic or dermatological purposes.

The device may also be combined with a payment terminal or other computing, telephony or diagnostic device.

Figure 13:
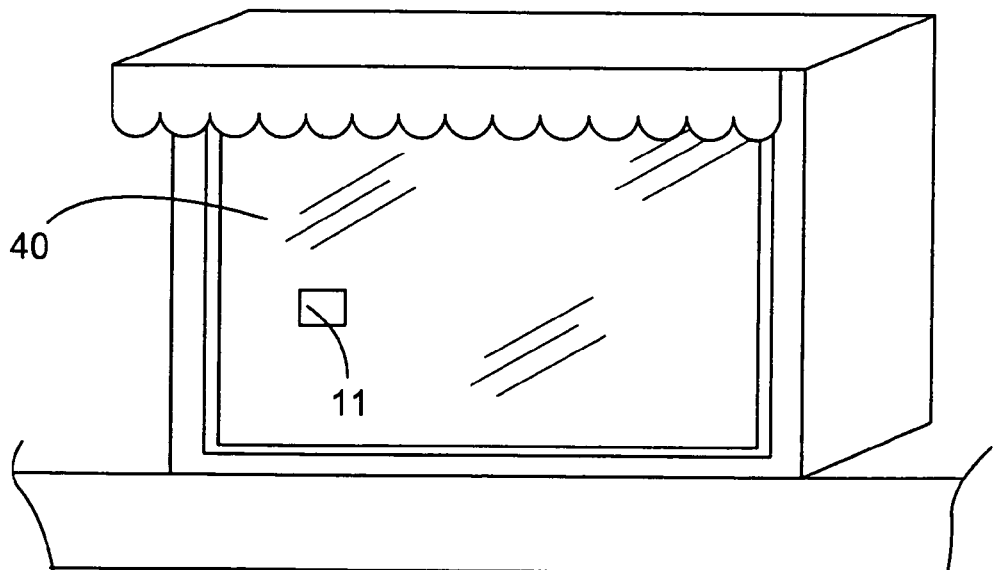
FIG. 13 illustrates the use of a device produced in accordance with the invention in a display window.

A device according to the invention may also be integrated into a display window 40, as illustrated in FIG. 13, so as to allow a passer-by to interrogate the display window, for example in order to obtain information about services offered or about the articles displayed.

The device according to the invention may also be integrated into a touch screen.

In the embodiment in FIG. 13, only a single device according to the invention has been shown, but it goes without saying that the display window or touch screen may be provided with several devices according to the invention.

The block 33 of the embodiment shown in FIG. 12 may also be replaced with a cast resin that encapsulates, over the top, at least the source 13 and the sensor 15.

The sensor 15 may have more than one row of elementary detectors, for example at least two rows of detectors, especially so as to allow a speed of movement of the finger over the detection surface to be measured, which may improve the quality of the image of the fingerprint and make it easier to recognize it.

The speed of movement of the finger may for example be determined by measuring the time taken for one line of the image read by one of the rows of the sensor to be read by the other row.

Of course, the features of the various embodiments that have just been described may be combined with one another without thereby departing from the scope of the present invention.

Various modifications may also be made to the embodiments described. In particular, it is possible for example for the detection surface not to be plane.

Throughout the description, including the claims, the expression "including a" or "comprising a" must be understood as being synonymous with "including at least one" or "comprising at least one", unless specified otherwise.

The invention claimed is:

1. An optical imaging device, comprising:
    a light source;
    an optical medium in which the light coming from the source is propagated;
    a detection surface defined by one boundary of the optical medium and configured to contact a finger; and
    an image sensor toward which the light coming from the source and undergoing a reflection on the detection surface is reflected in the absence of the finger, the device being configured so that the source appears from the sensor as being sufficiently a point for an image to be able to form directly on the sensor without a lens system, wherein the light source is a light-emitting diode or a laser diode, with no diffuser or lens, and wherein the light source is located in the optical medium.

2. The device as defined in claim 1, wherein two rays emanating from two extreme points of the source and passing through the same point on the detection surface form images on the sensor that are separated by less than 100 μm.

3. The device as defined in claim 1, wherein two rays emanating from two extreme points of the source and passing through the same point on the detection surface form images on the sensor that are separated by less than 50 μm.

4. The device as defined in claim 1, wherein the sensor is located in the optical medium.

5. The device as defined in claim 1, wherein the sensor is located outside the optical medium.

6. The device as defined in claim 1, being configured so that the light emitted by the source and reaching the sensor is reflected only on the detection surface.

7. The device as defined in claim 1, being configured so that the light emitted by the source undergoes at least two reflections before reaching the sensor.

8. The device as defined in claim 7, being configured so that the light emitted by the source undergoes at least two reflections in the optical medium before reaching the sensor.

9. The device as defined in claim 1, wherein the sensor is a linear sensor.

10. The device as defined in claim 1, wherein the sensor is a matrix sensor.

11. The device as defined in claim 1, wherein the source is modulated.

12. The device as defined in claim 1, wherein the source emits at several wavelengths and wherein the sensor is configured to analyze images corresponding to each of these wavelengths.

13. The device as defined in claim 1, wherein the sensor is separable from the optical medium.

14. The device as defined in claim 13, comprising a removable support comprising the sensor.

15. The device as defined in claim 14, wherein the removable support is a payment or access card.

16. The device according to claim 14, comprising a reader configured to cooperate with the support and comprising the optical medium.

17. The device according to claim 14, wherein the removable support comprising at least one microcircuit.

18. The device as defined in claim 1, wherein the source lies below the level of the surface of the sensor.

19. The device as defined in claim 18, wherein the source is located in a recess in a printed circuit.

20. The device of claim 19, wherein the printed circuit is a multilayer printed circuit.

21. The device as defined in claim 1, further comprising a block of a transparent material covering the sensor and the source.

22. The device as defined in claim 21, wherein the block is molded over the sensor and the source.

23. The device as defined in claim 21, wherein the block is bonded to the sensor and the source.

24. The device as defined in claim 23, wherein the block is bonded via an ultraviolet-curable adhesive.

25. The device as defined in claim 21, wherein the block includes on top of the sensor, means for reducing an amount of stray light reaching the sensor.

26. The device as defined in claim 25, wherein said means comprising a delustered surface.

27. The device as defined in claim 25, wherein said means comprising a mask.

28. The device as defined in claim 21, wherein a color of the material of the block is selected according to the wavelength of the source so as to promote the propagation of the light emitted by the source while attenuating the propagation of the stray light.

* * * * *